(12) United States Patent
Ruehle et al.

(10) Patent No.: US 10,770,697 B2
(45) Date of Patent: Sep. 8, 2020

(54) BATTERY CELL, BATTERY MODULE, AND METHOD FOR PRODUCING THE SAME

(71) Applicant: Robert Bosch GmbH, Stuttgart (DE)

(72) Inventors: Andreas Ruehle, Bietigheim-Bissingen (DE); Claus Gerald Pflueger, Markgröningen (DE); Markus Schmitt, Tamm (DE); Peter Bauckhage, Ilsfeld (DE); Torsten Koller, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/998,834

(22) Filed: Aug. 16, 2018

(65) Prior Publication Data
US 2019/0058170 A1 Feb. 21, 2019

(30) Foreign Application Priority Data
Aug. 16, 2017 (DE) .................. 10 2017 214 242

(51) Int. Cl.
| | |
|---|---|
| *H01M 2/06* | (2006.01) |
| *H01M 2/10* | (2006.01) |
| *H01M 10/655* | (2014.01) |
| *H01M 2/08* | (2006.01) |
| *H01M 2/30* | (2006.01) |

(Continued)

(52) U.S. Cl.
CPC .............. *H01M 2/06* (2013.01); *H01M 2/08* (2013.01); *H01M 2/1016* (2013.01); *H01M 2/1094* (2013.01); *H01M 2/30* (2013.01); *H01M 10/655* (2015.04); *H01M 10/0525* (2013.01); *H01M 10/647* (2015.04)

(58) Field of Classification Search
CPC ........ H01M 2/06; H01M 2/30; H01M 2/1016; H01M 2/08; H01M 10/647; H01M 10/0525; H01M 2/1094; H01M 10/655; H01M 2/1072; H01M 2/1022; H01M 2/0237; H01M 2/0202
See application file for complete search history.

(56) References Cited

U.S. PATENT DOCUMENTS 5,538,807 A 7/1996 Hagiuda
2009/0142660 A1* 6/2009 Hori ..................... H01M 2/0421
429/174

(Continued)

FOREIGN PATENT DOCUMENTS

DE 102008014155 A1 9/2009

*Primary Examiner* — Cynthia K Walls
(74) *Attorney, Agent, or Firm* — Michael Best & Friedrich LLP

(57) ABSTRACT

A battery cell having a first housing element (4) which holds the electrochemical components of the battery cell (2) and has an opening (6), and a second housing element (5) which has a voltage tap (7) to be accessed from a first surface (8) of the second housing element (5), the second housing element (5) closes off the opening (6) so that a first part region (91) of a second surface (9) of the second housing element (5) is immediately adjacent the interior space (10) of the first housing element (4), and that a second part region (92) of the second surface (9) of the second housing element (5) protrudes beyond the first housing element (4), wherein the second housing element (5) comprises a sealing element (11) connected to the first surface (8) and/or to the second part region (92) of the second surface (9).

19 Claims, 3 Drawing Sheets

(51) Int. Cl.
*H01M 10/647* (2014.01)
*H01M 10/0525* (2010.01)

(56) References Cited

U.S. PATENT DOCUMENTS

2011/0045324 A1 2/2011 Kritzer et al.
2011/0135976 A1 6/2011 Byun

* cited by examiner

BATTERY CELL, BATTERY MODULE, AND METHOD FOR PRODUCING THE SAME

BACKGROUND OF THE INVENTION

The invention relates to a battery cell. The subject of the present invention is also a battery module with such a battery cell. The invention moreover also relates to a method for producing such a battery module.

It is known from the prior art that batteries, such as in particular lithium-ion batteries, consist at least of one battery module or advantageously also of multiple battery modules. A battery module furthermore preferably has a plurality of individual battery cells which are connected to one another to form the battery module, wherein the individual battery cells can be connected to one another in series and/or in parallel by means of cell connectors. A temperature-control device is needed here in order to be able to operate the battery cells within a predetermined temperature range.

SUMMARY OF THE INVENTION

A battery cell according to the invention has the advantage that reliable sealing of a battery module having a battery cell according to the invention can be achieved.

According to the invention, a battery cell is provided for this purpose. The battery cell is here in particular a lithium-ion battery cell. The battery cell here has a housing which in particular has a prismatic design. The housing here comprises a first housing element and a second housing element. The first housing element here holds the electrochemical components of the battery cell, which comprise at least an anode, a cathode, and a separator. The first housing element furthermore has an opening. The second housing element has a voltage tap which is connected to the anode of the battery cell or the cathode of the battery cell in an electrically conductive fashion. The voltage tap is here arranged so that it can be accessed from a first surface of the second housing element. The second housing element furthermore closes off the opening formed in the first housing element in such a way that a first part region of a second surface of the second housing element, which is arranged opposite the first surface, is arranged immediately adjacent to the interior of the first housing element. A second part region of the second surface of the second housing element, which is arranged opposite the first surface, is arranged so that it protrudes beyond the first housing element. The second housing element here comprises a sealing element connected to the first surface and/or to the second part region of the second surface.

Advantageous developments and enhancements of the devices described in the independent claims are possible as a result of the features stated in the dependent claims.

It should be pointed out at this point that by a voltage tap which is arranged so that it can be accessed from the first surface of the second housing element, it should be understood that the voltage tap is arranged on the first surface of the second housing element, or is integrated into the housing element, in such a way that the voltage tap can be contacted immediately or directly from the first surface. In other words, this means that the voltage tap is arranged so that it can be contacted immediately or directly from the surroundings of the battery cell.

Because the second housing element protrudes beyond the first housing element, a sealing surface can thus be formed immediately on the battery cell.

It is consequently possible to exert a force, via the second housing element as such a sealing surface, on the sealing element of the battery cell and also to maintain it, as a result of which, as a whole, reliable sealing can be provided.

It is expedient if the sealing element is designed so that it is peripheral. It is thus possible to provide reliable sealing over the whole periphery of the battery cell.

It should be noted at this point that the periphery of the battery cell is arranged so that it is in particular parallel to the second housing element on the first surface and/or the second part region of the second surface. It should furthermore be noted that the sealing element can thus provide both radial sealing and axial sealing.

The second housing element advantageously has a first voltage tap, connected in electrically conductive fashion to the anode of the battery cell, and a second voltage tap, connected in electrically conductive fashion to the cathode of the battery cell. Both the first voltage tap and the second voltage tap are here arranged so that they can be accessed from the first surface of the second housing element. A simple design of a battery cell can thus be provided.

The second housing element furthermore has a third part region which is arranged so that it extends between the first part region of the second housing element and the second part region of the second housing element. The third part region of the second housing element is thus furthermore expediently connected to the first housing element. The third part region of the second housing element is thus in particular connected to the first housing element by being firmly bonded such as, for example, by adhesive, welding, or soldering, and/or by being positively locked such as, for example, by being hooked or snapped in. The connection of the third part region of the second housing element is furthermore preferably designed so that it forms a seal.

It is consequently possible to partition the interior of the first housing element from the surroundings of the battery cell and hence in particular to protect the electrochemical components of the battery cell.

According to an aspect of the invention, the first housing element and/or the second housing element are formed from a metal material. Such a metal material can be chosen from, for example, aluminum, copper, or nickel, wherein alloys of aluminum, copper, and/or nickel can be chosen.

The second part region of the second housing element preferably has a minimum extent of 3 mm to 7 mm. The minimum extent here refers in particular to the extent of that part of the second housing element which protrudes beyond the first housing element. A minimum extent of 3 mm to 7 mm here provides in particular the advantage that the sealing element can thus be arranged reliably and furthermore a reliable arrangement inside a battery module is at the same time possible.

The sealing element is preferably made from an elastomer, a silicone, or an adhesive. Reliable sealing of an interior of a battery module with a battery cell according to the invention can consequently be provided.

According to a concept of the invention, the sealing element is connected by being firmly bonded to the first surface of the second housing element and/or the second part region of the second surface of the second housing element.

Such a firmly bonded connection can be achieved by, for example, adhesive bonding or also injection molding.

According to a further concept of the invention, the sealing element is connected by force-fitting to the first surface of the second housing element and/or the second part region of the second surface of the second housing element.

Such a connection by force-fitting can be provided, for example, by clamping preferably by means of being fitted together.

According to further concepts of the invention, the sealing element is connected by being force-fitted or positively locked to the first surface of the second housing element and/or to the second part region of the second surface of the second housing element. For this purpose, the sealing element can be inserted, for example, into a groove or the sealing element can preferably also have guide elements.

The subject of the present invention is also a battery module which has an abovedescribed battery cell. The battery module furthermore has a battery cell holder which comprises at least one interior space through which at least one temperature-control fluid can flow. The battery cell is thus held in the battery cell holder in such a way that the sealing element seals the interior space in fluid-tight fashion from the surroundings, and that the first sealing element is arranged so that temperature-control fluid can flow around it.

Such a battery module provides the particular advantage that reliable sealing of the interior space of the battery cell holder by means of the sealing element of the battery cell is possible, and furthermore the first housing element which holds the electrochemical components of the battery cell can be reliably temperature-controlled by temperature-control fluid flowing around it. The battery cell or its first housing element can be temperature-controlled directly by a temperature-control fluid without the voltage tap or the first voltage tap and the second voltage tap can come into contact with a temperature-control fluid.

It is of course also possible here that the battery cell of the battery module can be developed with all of the advantageous developments mentioned in connection with the battery cell.

The battery module advantageously furthermore has a retaining element which is designed for holding the sealing element of the battery cell and/or the second housing element of the battery cell. The retaining element can here be designed as an integral part of the battery cell holder or can also be designed as an additional component which can be connected to the battery cell holder.

It is expedient if the first surface of the second housing element is arranged so that it can be accessed from the surroundings of the battery module.

It is consequently possible to electrically contact the voltage tap, arranged so that it can be accessed from the first surface, of the battery cell. It is in particular also consequently possible to electrically contact the first voltage tap arranged so that it can be accessed from the first surface, and the second voltage tap arranged so that it can be accessed from the first surface. It is hence possible to electrically contact the battery cell of the battery module from the surroundings of the battery module, wherein the voltage tap or the first voltage tap and the second voltage tap are partitioned from the temperature-control fluid which flows around the first housing element by means of the sealing element in sealing fashion.

The subject of the present invention is also a method for producing a battery module according to the invention. Here, in a first method step, an abovedescribed battery cell according to the invention is provided. Furthermore, in the first method step, a battery cell holder of a battery module is also provided which has an interior space through which a temperature-control fluid can flow. In a second method step, the battery cell is here arranged in the battery cell holder in such a way that the sealing element seals the interior space in fluid-tight fashion from the surroundings, and that the first housing element is arranged so that temperature-control fluid can flow around it.

In the second method step, a force is advantageously furthermore applied to the second housing element in such a way that the sealing element is deformed. It is hence possible to provide more reliable sealing by means of the deformation of the sealing element.

BRIEF DESCRIPTION OF THE DRAWINGS

Embodiments of the invention are shown in the drawings and explained in detail in the following description.

In the drawings.

DETAILED DESCRIPTION

Figure 1:
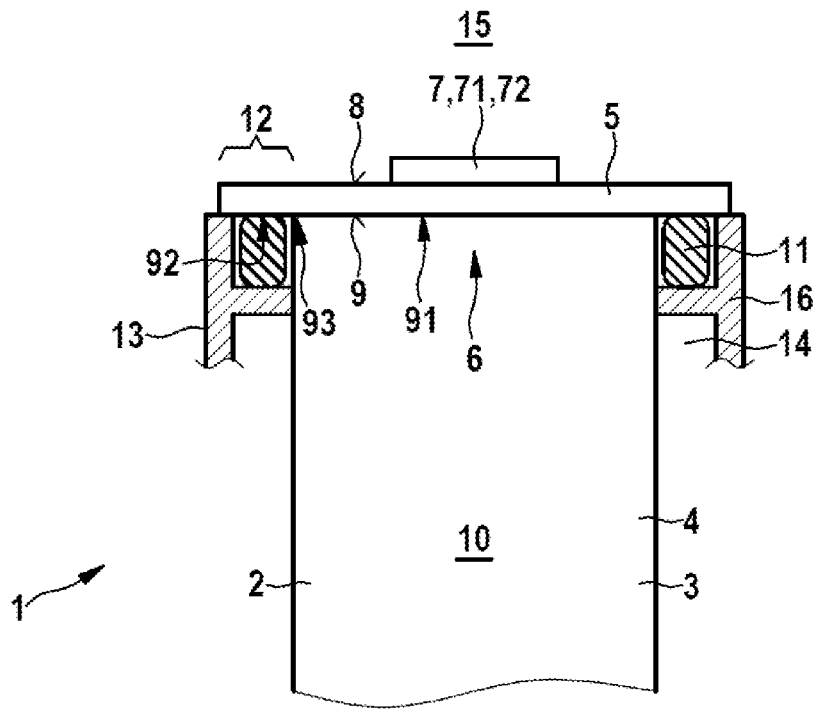
FIG. 1 shows a detail of a first embodiment of a battery module according to the invention.

FIG. 1 shows a detail of a first embodiment of a battery module 1 according to the invention.

The battery module 1 here has a battery cell 2, wherein the battery cell 2 is in particular a lithium-ion battery cell.

The battery cell 2 has a housing 3, wherein the housing 3 according to the embodiment shown in FIG. 1 has a prismatic design.

The housing 3 furthermore comprises a first housing element 4 and a second housing element 5.

The first housing element 4 here holds electrochemical components of the battery cell 2 which cannot be seen in FIG. 1, wherein the electrochemical components of the battery cell 2 comprises at least an anode, a cathode, and a separator. The first housing element 4 also has an opening 6.

The second housing element 5 has a voltage tap 7 connected in electricaly conductive fashion to the anode of the battery cell 2 or the cathode of the battery cell 2. The second housing element 5 has in particular a first voltage tap 71 connected in electrically conductive fashion to the anode of the battery cell 2, and has a second voltage tap 72 connected in electrically conductive fashion to the cathode of the battery cell 2. In particular only the first voltage tap 71 or only the second voltage tap 72 can be seen here in FIG. 1. The voltage tap 7 or the first voltage tap 71 and the second voltage tap 72 are arranged so that they can be accessed from a first surface 8 of the second housing element 5.

The second housing element 5 furthermore also has a second surface 9 arranged opposite the first surface 8. The second housing element 5 here closes the opening 6 formed by the first housing element 4. A first part region 91 of the second surface 9 of the second housing element 5 is here arranged immediately adjacent to the interior 10 of the first housing element 4. A second part region 92 of the second surface 9 of the second housing element 5 is here arranged so that it protrudes beyond the first housing element 4. In other words, this means that the second housing element 5 projects beyond the periphery of the first housing element 4.

The second housing element 5 furthermore has a third part region 93 which, as can be seen in FIG. 1, is arranged between the first part region 91 and the second part region 92. The third part region 93 of the second housing element 5 is here furthermore connected to the first housing element 4, and this connection is in particular produced by being firmly bonded and/or positively locked.

The second housing element 5 furthermore comprises a sealing element 11. The sealing element 11 is here connected to the second part region 92 of the second surface 9 according to the exemplary embodiment shown in FIG. 1.

The sealing element 11 can here be connected to the second part region 92 of the second surface 9 of the second housing element 5 by being, for example, firmly bonded, force-fitted, friction locked, and/or positively locked.

Figure 2:
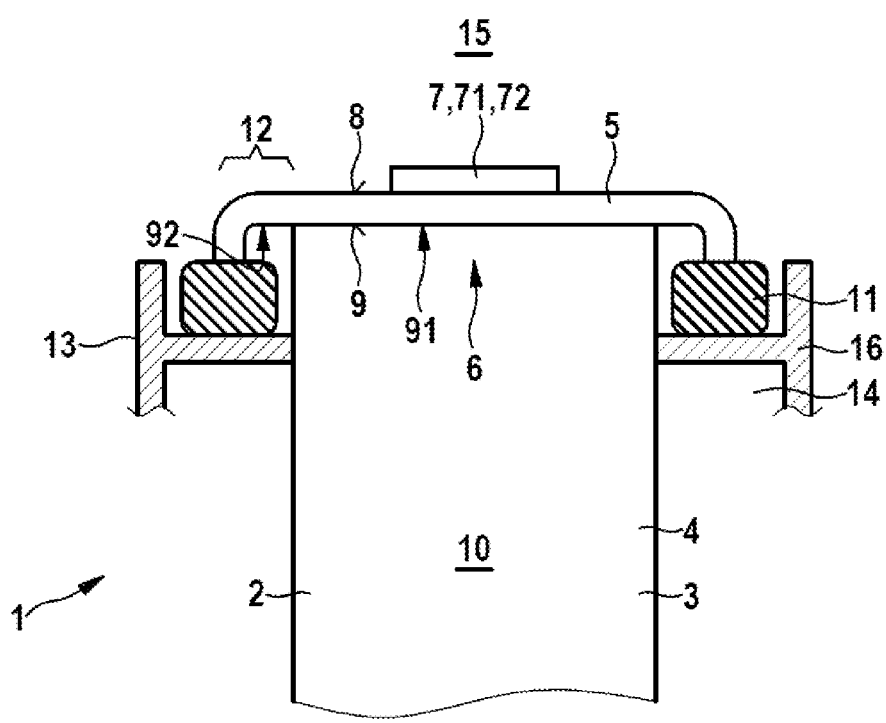
FIG. 2 shows a detail of a second embodiment of a battery module according to the invention.
Figure 3:
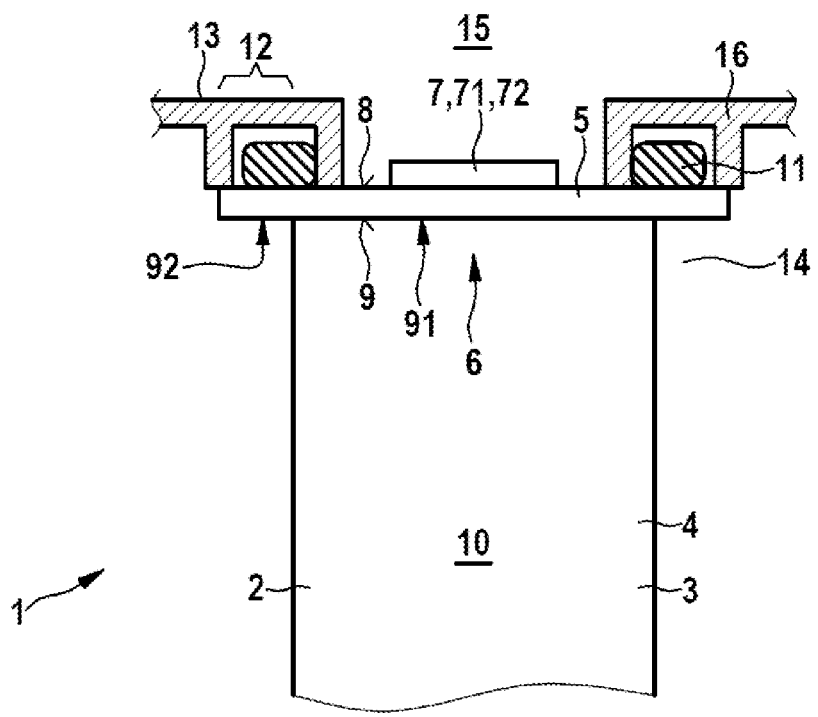
FIG. 3 shows a detail of a third embodiment of a battery module according to the invention.
Figure 4:
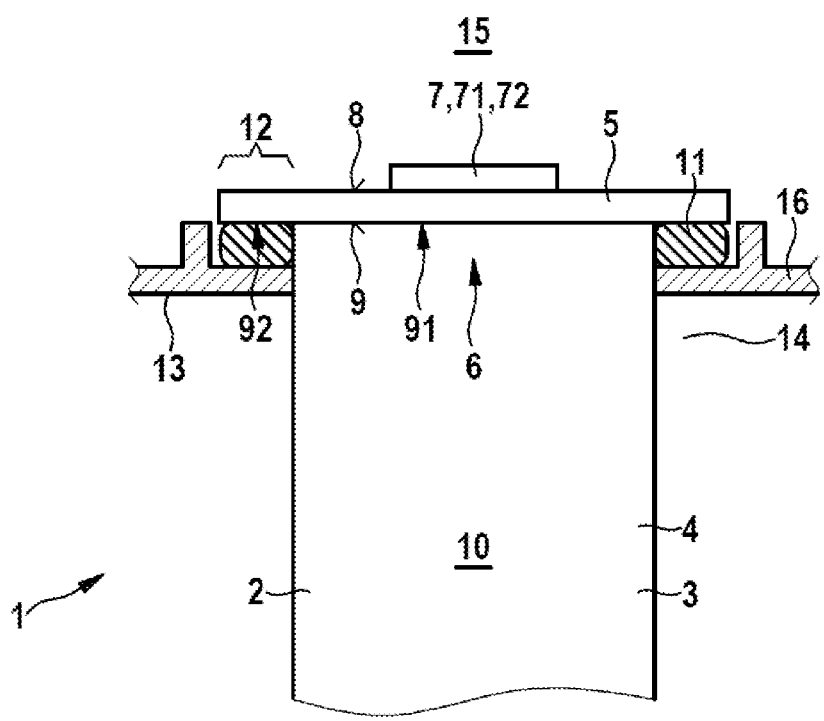
FIG. 4 shows a detail of a fourth embodiment of a battery module according to the invention.

FIGS. 2 to 4 each show further embodiments of battery modules 1 according to the invention. The same reference numerals here in each case also refer to elements which will not be described again in connection with FIGS. 2 to 4.

FIG. 2 shows a detail of a second embodiment of a battery module 1 according to the invention. The sealing element 11 is here, according to the exemplary embodiment shown in FIG. 2, connected to the second part region 92 of the second surface 9. It should be noted here that the second part region 92 includes in each case all surfaces arranged parallel to the first surface 91.

FIG. 2 thus shows in particular an embodiment in which the second housing element 5 does not have a completely flat design but instead can have rounded edges.

FIG. 3 shows a detail of a third embodiment of a battery module 1 according to the invention. The sealing element 11 is here, according to the exemplary embodiment shown in FIG. 3, connected to the first surface 8. The sealing element 11 can here be connected to the first surface 8 of the second housing element 5 by being, for example, firmly bonded, force-fitted, friction locked, and/or positively locked.

FIG. 4 shows a detail of a fourth embodiment of a battery module 1 according to the invention. The sealing element 11 is here, according to the exemplary embodiment shown in FIG. 4, connected to the second part region 92 of the second surface 9.

Other features of the exemplary embodiments shown will now be described together for FIGS. 1 to 4.

The sealing elements 11 according to the exemplary embodiments in FIGS. 1 to 4 are furthermore in each case arranged peripherally so that reliable sealing can be provided by means of the sealing elements 11 over the whole periphery.

The first housing element 4 and/or the second housing element 5 are preferably in each case made from a metal material such as, for example, aluminum, copper, or nickel.

The sealing element 11 is preferably made from an elastomer, a silicone, or an adhesive.

The second part region 92 here has a minimum extent which is designated in FIGS. 1 to 4 by the reference numeral 12, wherein the minimum extent 12 has a value between 3 mm and 7 mm. In other words, the minimum extent refers to the amount by which the second housing element 5 projects beyond the first housing element 4.

The battery module 1 furthermore has a battery cell holder 13, which is shown in each case partially in FIGS. 1 to 4. The battery cell holder 13 here in each case delimits an interior space 14 through which a temperature-control fluid can flow. The battery cell 2 is here held in the battery cell holder 13 in such a way that the sealing element 11 seals the interior space 14 in fluid-tight fashion from the surroundings 15. Furthermore, as can be seen in FIGS. 1 to 4, the first housing element 4 is arranged so that a temperature-control fluid flowing through the interior space 14 can flow around it.

The battery module 1 can furthermore comprise a retaining element 16.

The retaining element 16 can here be designed to hold the sealing element 11 of the battery cell 2. The retaining element 16 can here also be designed to hold the second housing element 5 of the battery cell 2.

The retaining element 16 can here be, for example, be an integral part of the battery cell holder 13.

Figure 5:
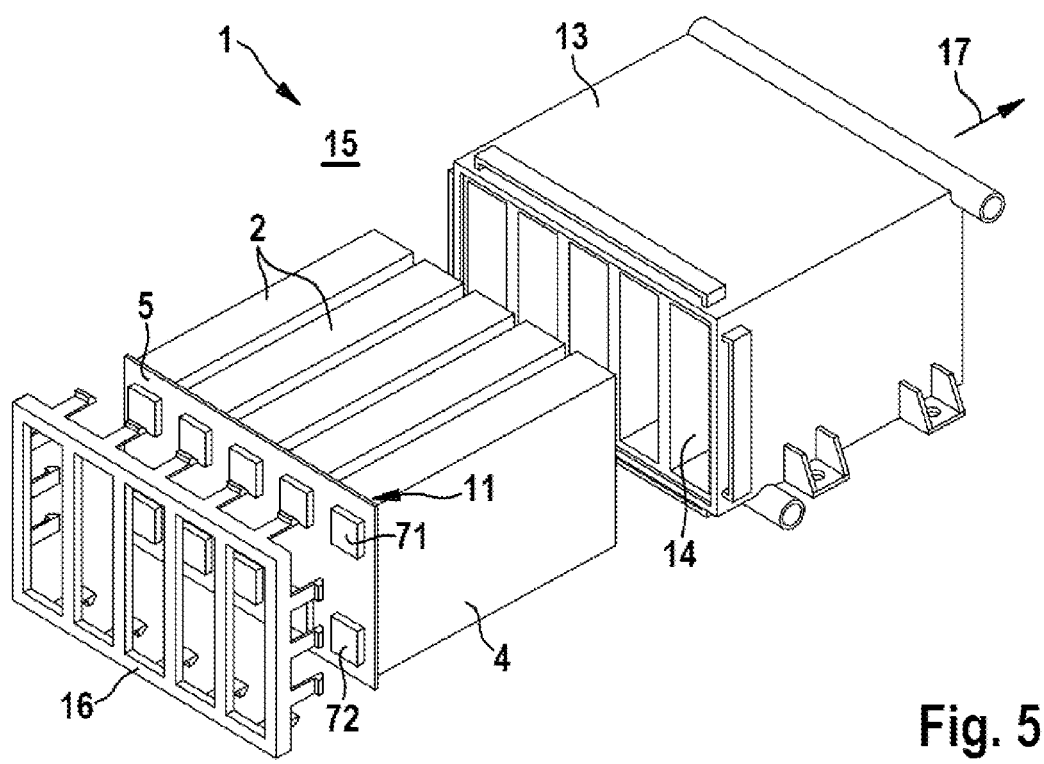
FIG. 5 shows an embodiment of a battery module according to the invention in a perspective exploded view.

A further embodiment of a battery module 1 is explained with the aid of FIG. 5, in which the retaining element 16 is designed as a separate element.

It can be seen as a whole in all of FIGS. 1 to 5 that the first surface 8 of the second housing element 5 is arranged so that it can be accessed from the surroundings 15 of the battery module 1. The voltage tap 7 or the first voltage tap 71 and the second voltage tap 72 are in particular arranged so that they can be accessed from the surroundings 15 of the battery module 1.

FIG. 5 shows a perspective exploded view of an embodiment of a battery module 1 according to the invention.

A total of five battery cells 2 according to the invention can here be seen in FIG. 5. The first housing element 4, the second housing element 5, and the first voltage tap 71 and the second voltage tap 72 can in particular be seen hereby. The battery cells 2 furthermore each have a sealing element 11 which is connected to the second part region 92 of the second surface 8 of the second housing element 5 but which cannot be seen in FIG. 5.

The battery module 1 according to FIG. 5 furthermore has a battery cell holder 13 with an interior space 14. The battery cells 2 can here be arranged in the interior space 14 of the battery cell holder 13, wherein the battery cells 2 can be pushed into the battery cell holder 13, for example, in the direction 17 shown. In an arrangement of the battery cells 2 in the battery cell holder 13, the interior space 14 of the battery module 1 is sealed with respect to the surroundings 15 in a fluid-tight fashion. The sealing elements 11 in particular seal the interior space 14 with respect to the surroundings 15.

In an arrangement of the battery cells 2 in the battery cell holder 13, a force can, for example, be applied to the second housing elements 5 in order to deform the sealing elements 11.

It can furthermore be seen in FIG. 5 that the battery module 1 has a retaining element 16 which is designed as an element that is designed separately from the battery cell holder 13.

The retaining element 16 can here be connected, for example, to the battery cell holder 13 by means of a snap mechanism.

Figure 6:
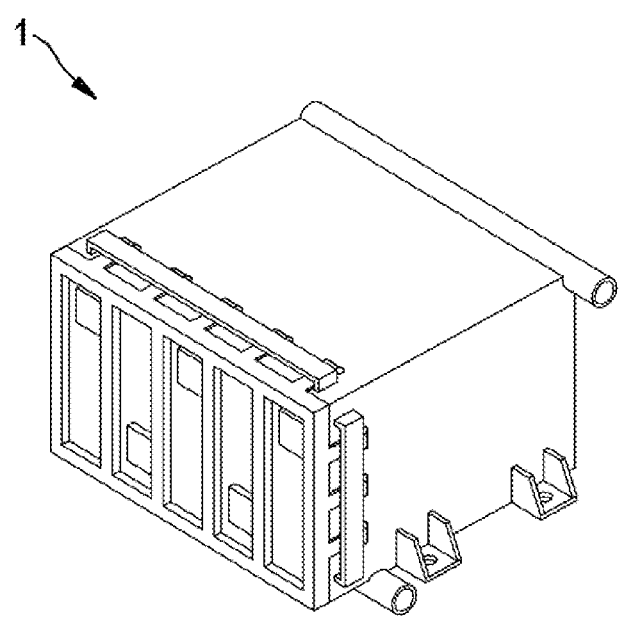
FIG. 6 shows an embodiment of the battery module according FIG. 5 in a perspective view.

FIG. 6 shows a perspective view of the embodiment of the battery module according to FIG. 5 in an assembled state.

It should also be noted at this point that the embodiment according to FIGS. 5 and 6 can comprise in each case connections for the inflow and outflow of a temperature-control fluid.

The invention claimed is:

1. A battery module having a battery cell, wherein the battery cell has a housing, wherein the housing comprises a first housing element which holds electrochemical components of the battery cell which comprise at least an anode, a cathode, and a separator, and furthermore has an opening, wherein the housing also comprises a second housing element which has a voltage tap connected to the anode of the battery cell or the cathode of the battery cell in an electrically conductive fashion, wherein the voltage tap is furthermore arranged to be accessed from a first surface of the second housing element, wherein the second housing element furthermore closes off the opening formed in the first housing element in such a way that a first part region of a second surface of the second housing element, which is opposite the first surface, is immediately adjacent to the interior space of the first housing element, and that a second part region of the second surface of the second housing element, which is opposite the first surface, protrudes beyond the first housing element, characterized in that the second housing element comprises a sealing element connected to at least one of the first surface and the second part region of the second surface, and wherein the battery module has a battery cell holder which comprises an interior space through which a temperature-control fluid can flow, characterized in that the battery cell is held in the battery cell holder in such a way that the sealing element seals the interior space in fluid-tight fashion from the surroundings, and that the first sealing element is arranged so that temperature-control fluid can flow around it.

2. The battery module according to claim 1, characterized in that the second housing element has a first voltage tap, connected in electrically conductive fashion to the anode of the battery cell, and a second voltage tap, connected in electrically conductive fashion to the cathode of the battery cell, wherein the first voltage tap and the second voltage tap are arranged to be accessed from a first surface of the second housing element.

3. The battery module according to claim 1, characterized in that the second housing element has a third part region which extends between the first part region of the second housing element and the second part region of the second housing element, wherein the third part region of the second housing element is furthermore connected to the first housing element.

4. The battery module according to one claim 1, characterized in that the first housing element and/or the second housing element are formed from a metal material.

5. The battery module according to claim 1, characterized in that the second part region has a minimum extent of 3 mm to 7 mm.

6. The battery module according to claim 1, characterized in that the sealing element is made from an elastomer, a silicone, or an adhesive.

7. The battery module according to claim 1, characterized in that the sealing element is connected to the first surface of the second housing element and/or the second part region of the second surface of the second housing element by being firmly bonded, by being force-fitted, by being friction locked, or by being positively locked.

8. The battery module according to claim 1, wherein the retaining element holds the sealing element of the battery cell and the second housing element of the battery cell.

9. The battery module according to claim 1, characterized in that the first surface of the second housing element is arranged to be accessed from the surroundings of the battery module.

10. A method for producing a battery module according to claim 1, the method comprising
   in a first method step, providing the battery cell and the battery cell holder, which has an interior space through which a temperature-control fluid can flow, and
   in a second method step, arranging the battery cell in the battery cell holder in such a way that the sealing element seals the interior space in fluid-tight fashion from the surroundings, and such that the first housing element is arranged so that the temperature-control fluid can flow around the first housing element.

11. The method according to claim 10, characterized in that, in the second method step, a force is applied to the second housing element in such a way that the sealing element is deformed.

12. The battery module according to claim 1, characterized in that the battery cell is a lithium-ion battery cell, and the housing has a prismatic design.

13. The battery module according to claim 1, where the sealing element is connected to the first surface.

14. The battery module according to claim 13, where the sealing element is also connected to the second part region of the second surface.

15. The battery module according to claim 1, where the sealing element is connected to the second part region of the second surface.

16. The battery module according to claim 1, characterized in that the second housing element has a third part region which extends between the first part region of the second housing element and the second part region of the second housing element, wherein the third part region of the second housing element is furthermore connected to the first housing element, and is connected by being firmly bonded and/or positively locked.

17. The battery module according to one claim 1, characterized in that the first housing element and/or the second housing element are formed from aluminum, copper, and/or nickel.

18. The battery module according to claim 1, characterized in that the sealing element is connected to the first surface of the second housing element and/or the second part region of the second surface of the second housing element by being adhesively bonded, or injection molded, or clamped, or friction locked, or positively locked.

19. The battery module according to claim 1, characterized in that the sealing element is arranged peripherally.

* * * * *